(12) United States Patent
Muller

(10) Patent No.: US 9,150,386 B2
(45) Date of Patent: Oct. 6, 2015

(54) WIND ENERGY INSTALLATION WORKING GANTRY AND WIND ENERGY INSTALLATION

(75) Inventor: Johann Muller, Aurich (DE)

(73) Assignee: Wobben Properties GmbH, Aurich (DE)

( * ) Notice: Subject to any disclaimer, the term of this patent is extended or adjusted under 35 U.S.C. 154(b) by 62 days.

(21) Appl. No.: 13/816,722

(22) PCT Filed: Jun. 20, 2011

(86) PCT No.: PCT/EP2011/060219
§ 371 (c)(1),
(2), (4) Date: Apr. 18, 2013

(87) PCT Pub. No.: WO2012/019815
PCT Pub. Date: Feb. 16, 2012

(65) Prior Publication Data
US 2013/0199876 A1 Aug. 8, 2013

(30) Foreign Application Priority Data

Aug. 13, 2010 (DE) .................... 20 2010 011 397 U

(51) Int. Cl.
| | |
|---|---|
| B66B 13/16 | (2006.01) |
| B65G 1/08 | (2006.01) |
| B65G 13/12 | (2006.01) |
| F03D 1/00 | (2006.01) |
| F03D 11/00 | (2006.01) |

(52) U.S. Cl.
CPC . *B66B 13/16* (2013.01); *B65G 1/08* (2013.01); *B65G 13/12* (2013.01); *F03D 1/003* (2013.01); *F03D 11/00* (2013.01); *F05B 2230/61* (2013.01); *Y02E 10/72* (2013.01)

(58) Field of Classification Search
CPC ........................................................ B66B 13/16
USPC .................................. 182/128; 187/330, 331
See application file for complete search history.

(56) References Cited

U.S. PATENT DOCUMENTS 1,340,664 A * 5/1920 Miller ............................ 187/310
1,439,604 A * 12/1922 Butler ............................ 187/326
(Continued)

FOREIGN PATENT DOCUMENTS

| CN | 2716224 Y | 8/2005 |
|---|---|---|
| CN | 201105934 Y | 8/2008 |

(Continued)

*Primary Examiner* — Alvin Chin-Shue
(74) *Attorney, Agent, or Firm* — Seed IP Law Group PLLC

(57) ABSTRACT

The present invention concerns a wind power installation working gallery comprising a working platform and a railing arranged on the working platform, wherein the railing can be closed off by means of a closure element and the closure element is arranged in a transfer region to a lift.

The invention concerns in particular a wind power installation having a locking device with a locking mechanism for receiving a first locking element and a second locking element, wherein the first locking element is connected to the lift and the second locking element is connected to the closure element, and the locking mechanism is adapted to release one of the two locking elements by means of the locking of the respective other locking element relative to the locking device.

The invention further concerns a locking device, a lift and a wind power installation.

10 Claims, 4 Drawing Sheets

(56) References Cited

U.S. PATENT DOCUMENTS

| | | | | | |
|---|---|---|---|---|---|
| 1,799,600 | A | * | 4/1931 | Nell | 187/331 |
| 2,827,983 | A | * | 3/1958 | Lowe | 187/331 |
| 5,069,324 | A | * | 12/1991 | Lepage et al. | 194/212 |
| 5,855,253 | A | * | 1/1999 | Bourgeois | 187/330 |
| 6,062,345 | A | * | 5/2000 | Olofsson | 187/309 |
| 2006/0243534 | A1 | * | 11/2006 | Miller et al. | 187/313 |

FOREIGN PATENT DOCUMENTS

| | | |
|---|---|---|
| CN | 101514689 A | 8/2009 |
| CN | 101407298 B | 6/2010 |
| DE | 237239 B | 4/1964 |
| EP | 0 739 851 A2 | 10/1996 |
| EP | 2 093 417 A2 | 8/2009 |
| FR | 2 821 613 A1 | 9/2002 |
| GB | 1 287 619 A | 9/1972 |
| JP | 63-52874 U | 4/1988 |
| JP | 01-104588 | 4/1989 |
| JP | H07106864 B2 | 11/1995 |
| JP | 2002-293488 A | 10/2002 |
| JP | 2006-522884 A | 10/2006 |
| JP | 2008-520861 A | 6/2008 |
| KR | 1999-0071906 A | 9/1999 |
| WO | 97/20766 A1 | 6/1997 |
| WO | 03/002447 A1 | 1/2003 |

* cited by examiner

WIND ENERGY INSTALLATION WORKING GANTRY AND WIND ENERGY INSTALLATION

BACKGROUND

1. Technical Field

The present invention concerns a wind power installation working gallery comprising a working platform and a railing arranged on the working platform, wherein the railing can be closed off by a closure element and the closure element is arranged in a transfer region to a lift.

The invention further concerns a wind power installation comprising at least one aforementioned wind power installation working gallery, a lift and a locking device for a wind power installation.

2. Description of the Related Art

Working galleries or scaffoldings of the above-indicated kind are used during the erection of wind power installations or for service operations during the working life of wind power installations. Certain types of wind power installations utilize the temporary provision of working galleries on or in a wind power installation, in particular during installation or dismantling, while in other types of installations, in particular large wind power installations, one or more working galleries are frequently fixedly installed. Working galleries of the above-indicated type can also be arranged in the nacelle of a wind power installation. The working galleries of certain wind power installations are accessed by a lift. Access from the lift to the working gallery of the installation occurs in a transfer region on the working gallery. If operations have to be carried out in parallel on a plurality of galleries or if the lift is needed for going to the nacelle or for returning to the ground, it happens in operation that working personnel remain on the working galleries when the lift car is not waiting at the platform. For safety reasons it is beneficial for the transfer region from the working galleries to be closed off by a closure element so that the risk of accidents involving people falling off the gallery can be reduced as much as possible.

For that purpose known arrangements provide locking devices on the railings of working platforms, by which the closure elements can be locked to the railing. It will be noted however that, with the known arrangements, it is possible for the closure element to be left unlocked due to negligence or even deliberately when the lift leaves the working gallery. That is considered as a disadvantage in the state of the art and at the same time is perceived as a serious safety loophole.

BRIEF SUMMARY

One or more embodiments of the present invention are directed to providing a wind power installation working gallery, a locking device provided for same, a lift and a wind power installation, which respectively may provide improved safety against accidents involving falling.

One embodiment of the present invention is directed to a wind power installation working gallery comprising a locking device having a locking mechanism for receiving a first locking element and a second locking element, wherein the first locking element is connected to the lift and the second locking element is connected to the closure element, and the locking mechanism is adapted to release one of the two locking elements by locking the respective other locking element relative to the locking device.

The invention is based on the realization that safety to prevent an unintended fall through the transfer region of the railing of the working gallery is most effectively improved by preventing the lift from moving away from the working gallery without previously securing the transfer region by locking the closure element relative to the working gallery. According to one embodiment of the invention, to unlock the locking device of the working gallery, the first locking element is moved into a locking position relative to the locking mechanism of the locking device.

Due to the fact that the first locking element however is also connected to the lift and in particular is mechanically fixedly connected thereto, in addition to the first locking element, the lift is also in a locking position when the second locking element associated with the closure element on the working gallery is in a release position. According to one embodiment of the invention, the locking position of the first locking element can be released exclusively by the second locking element being moved into a locking position relative to the locking device. Consequently the locking mechanism of the locking device is to be designed to always hold either the first locking element or the second locking element in a locking position so that there are two safety-relevant conditions alternatively. These are on the one hand locking of the closure element on the working gallery in the absence of the lift and secondly the presence of the lift at the working gallery in the release position of the closure element. In this embodiment, the removal of the first locking element and thus release of the lift from the working gallery is prevented when the closure element is not locked on the working gallery.

Preferably the locking mechanism has blocking capability for alternate positively locking and/or force-locking connection to the first and second locking elements. The blocking capability preferably includes at least one blocking body for positive locking and/or force-locking to the first or second locking element, which can be moved out of engagement with the first or second locking element by a displacement body associated with the respective other locking element.

An advantageous development of one embodiment of the invention provides that the locking mechanism is adapted to receive the first locking element in the form of a coin, a profiled and/or contoured flat body, a bar or a hollow body. The first locking element is preferably of such a configuration that it is only that element that can be brought into engagement with the locking mechanism. That excludes an operator introducing into the locking mechanism an alternative, commercially usual article which is not fixedly connected to the lift. In the case of a coin as the locking element that is preferably achieved in that the coin is associated with a foreign currency. That limits possible ways of circumventing the use which is in conformity with the safety aspect and which is in the properly designated fashion.

Preferably the second locking element is similarly in the form of a coin, a profiled and/or contoured flat body, bar or hollow body.

Particularly preferably the locking mechanism is designed in the manner of a deposit lock system. The advantage in using a deposit lock system is in particular that such systems are commercially available and can also be retro-fitted at very low cost to older working galleries which are already installed. The term deposit lock system is used to denote for example a lock system for shopping trolleys or baggage storage facilities.

The locking mechanism is preferably arranged within a housing of the locking device. The housing ensures protection from damage and/or improper opening of the locking mechanism in a manner which is not in accordance with the specified requirements. This also provides protection from the ingress of dirt.

In a preferred embodiment of the working gallery the locking mechanism in the locking device is arranged stationarily on the working gallery, preferably on the railing. Arranging the locking mechanism at a height which is agreeable to a user, preferably at hip height, simplifies operation.

In a further advantageous embodiment of the working gallery according to the invention the closure element is connected to the railing pivotably in a first portion of the transfer region to the lift, and the locking mechanism is arranged in a second portion, opposite to the first portion, of the transfer region to the lift. Preferably the closure element is a bar, chain or a door. The choice of the closure element preferably depends on the size of the working gallery. As an alternative to a pivotable arrangement of the closure element arrangements which are displaceable in parallel relationship are preferably also to be used, particularly when the amount of space required does not allow a pivotal movement.

Some embodiments are directed to providing a locking device for closing off a railing on a working platform by a closure element, wherein the closure element is arranged in a transfer region to a lift, comprising a locking mechanism for receiving a first locking element and a second locking element, wherein the first locking element is connected to the lift and the second locking element is connected to the closure element, and the locking mechanism is adapted to release one of the two locking elements by locking of the respective other locking element relative to the locking device. The advantages of the locking device according to the invention will be apparent from the foregoing description.

In the case of a lift for a wind power installation having a ground plane and at least one working gallery, that is adapted for travelling to a ground plane and the at least one working gallery, and has an access portion as well as a first locking element connected to the lift, the present invention further attains the object thereof in that the lift for travelling to a wind power installation working gallery is in accordance with one of the preferred embodiments of the present invention.

A development of the lift according to the invention provides that the first locking element for actuation of a locking device is designed in accordance with a preferred embodiment of the present invention, wherein the first locking element is connected to the lift by a first connecting member, preferably a chain, a wire, a wire mesh or a cable, in a first portion of the connecting member, wherein the connecting member is arranged in an internal space of the lift, with a second portion of the first connecting member, that is opposite to the first portion of the first connecting member, and the first connecting member extends through the access portion of the lift in the locking position.

In accordance with a further preferred embodiment of the invention the access portion of the lift has a detection device for detecting the presence of objects in the access portion, preferably a light barrier arrangement, and the lift has a control adapted to prevent travel of the lift when the detection device detects the presence of objects in the access portion of the lift. Two possible ways of preventing the lift from moving when the first locking element is in the locking position are to be considered as particularly preferred. On the one hand the lift is prevented from moving purely on the basis of the mechanical connection and on the other hand a control provides that the lift is capable of moving only when the door of the lift is closed. Closing of the door is either prevented mechanically as a consequence of the first connecting member extending through the access portion of the lift, or on the other hand by detection of blocking of the access portion by the first connecting member by the detection device.

In a preferred embodiment of the lift according to the invention the access portion of the lift has a door, the first connecting member extends past the door in the locking position of the first locking element, wherein the length of the first connecting member is such as to prevent closing of the door in the locking position of the first locking element, and wherein the lift has a control which provides that the lift moves only when the door is closed.

The invention further attains the object thereof by providing a wind power installation having a ground plane, at least one working gallery, a lift for travelling to the ground plane and the at least one working gallery, a railing arranged on the working gallery and having a transfer region to the lift, a closure element for closing off the transfer region to the lift, and a second locking element connected to the closure element, wherein the working gallery is designed in accordance with a preferred embodiment of the present invention.

Preferably in the wind power installation according to the invention the lift is designed in accordance with a preferred embodiment of the present invention.

The present invention further concerns the use of a locking device for closing off a railing on a working gallery of a wind power installation by a closure element, wherein the closure element is preferably arranged in a transfer region to a lift, and wherein the locking device is designed according to a preferred embodiment of the present invention.

The use of a locking device in the manner of a deposit lock system is particularly preferred for closing off a railing on a working gallery of a wind power installation by a closure element, wherein the closure element is preferably arranged in a transfer region to a lift.

BRIEF DESCRIPTION OF THE SEVERAL VIEWS OF THE DRAWINGS

The present invention is described in greater detail hereinafter by the following embodiments and with reference to the accompanying drawings in which.

DETAILED DESCRIPTION

Figure 1:
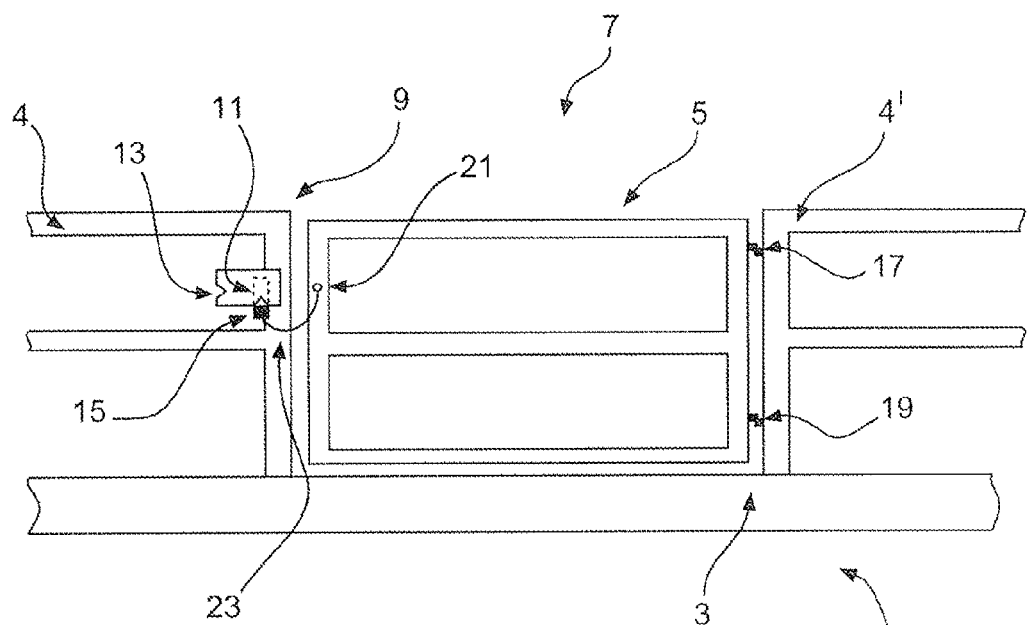
FIG. 1 shows a diagrammatic view of a transfer region of a wind power installation working gallery according to one embodiment of the present invention.

FIG. 1 shows a transfer region between a lift and a working gallery or platform structure 1 according to the present invention, looking from the direction of the lift. The wind power installation working gallery 1 has a working platform 3 and a railing 7. The railing 7 can be locked by a closure element 5. The closure element is fixed pivotably with a first hinge 17 and a second hinge 19 to a first portion 4' of the railing 7. A locking device 9 is arranged on a second portion 4 of the railing 7. In the illustrated configuration, the locking device 9 holds a second locking element 15 in a corresponding receiving part. The second locking element 15 is fixed by a second connecting member 23 on a portion 21 opposite the second locking element, on the closure element 5. The second connecting member 23 is in the present case in the form of a chain and the closure element 5 is in the form of a door. The locking device 9 has a receiving part 11 for receiving the second locking element and a receiving part 13 for receiving the first locking element.

Figure 2:
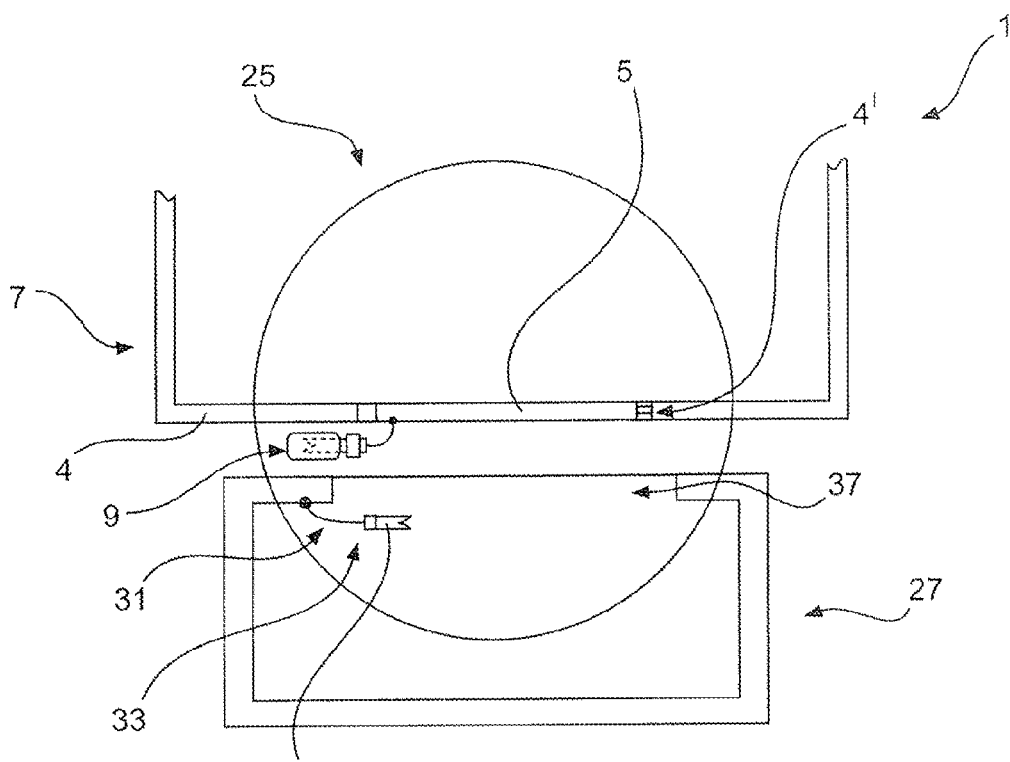
FIG. 2 shows a diagrammatic side view from above of the FIG. 1 embodiment.

In addition to the working gallery 1, FIG. 2 diagrammatically shows a view from above a lift 27. The lift 27 has an access portion 37 arranged between an internal space 37 of the lift 27 and the working gallery 1 in a transfer region 25 between the working gallery 1 and the lift 27.

The lift 27 has a first locking element 29 corresponding to the receiving part 13 shown in FIG. 1, for the first locking element 29. The first locking element 29 has a first portion 33 to which a first connecting member 31 is fixed, which may be in the form of a chain. The first connecting member 31 is fixedly connected at a second portion 35 in the internal space of the lift 27 to the lift 27.

The first locking element 29 is adapted to be brought into engagement with the locking device 9 and the locking mechanism accommodated therein. The locking device 9 is arranged stationarily on the railing 7 in the second portion 4 thereof. The lift 27 shown in FIG. 2 is freely movable in the illustrated operating position and is not connected to the working gallery 1.

Figure 3:
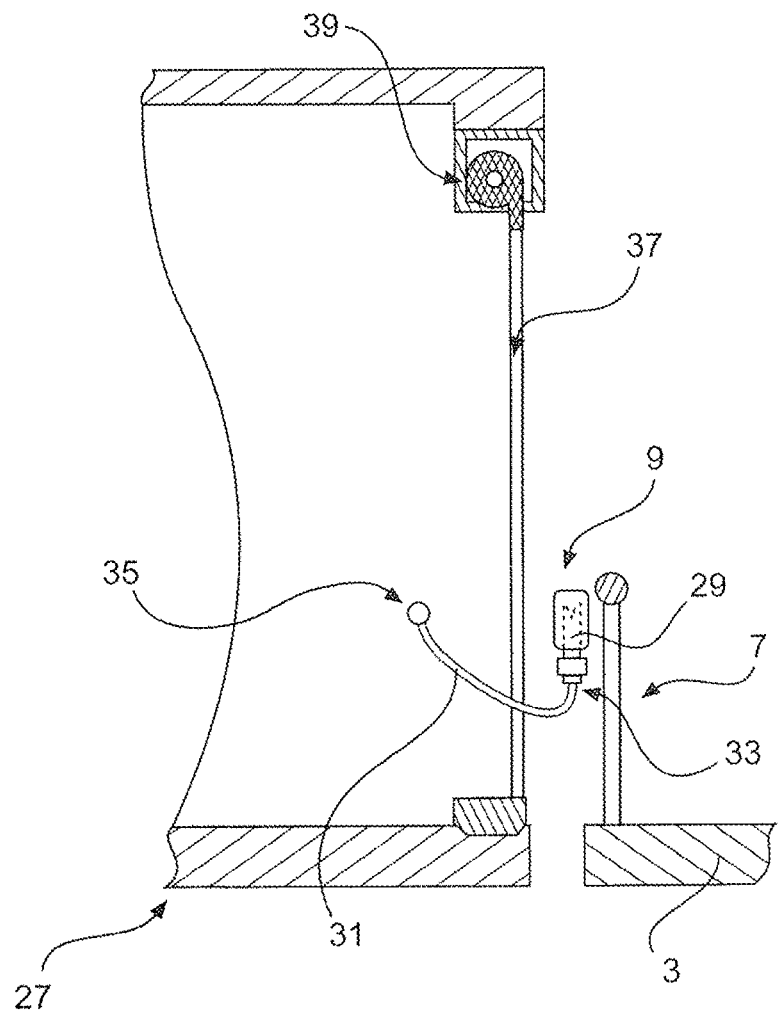
FIG. 3 shows a cross-sectional view of a lift according to one embodiment of the invention and a working gallery according to one embodiment of the invention from the side.

An alternative operating position is shown in FIG. 3. The lift 27 has a door 39 in the access portion 37. The door 39 in the present case is shown symbolically in the form of a roller grill. It is also particularly preferred for the door to be in the form of a sliding door. The door 39 is in the opened condition in FIG. 3. The first connecting member 31 which is fixed in the second portion 35 in the interior of the lift 27 extends through the access portion, past the opened door 39. The first portion 33 of the connecting member is passed into the proximity of the locking device 9 so that the first locking element 29 is disposed within the locking device 9 in a locking position with the locking mechanism. In the illustrated view the lift 27 is fixedly connected to the railing 7 on the working platform 3 and raising or lowering of the lift is prevented.

Figure 4:
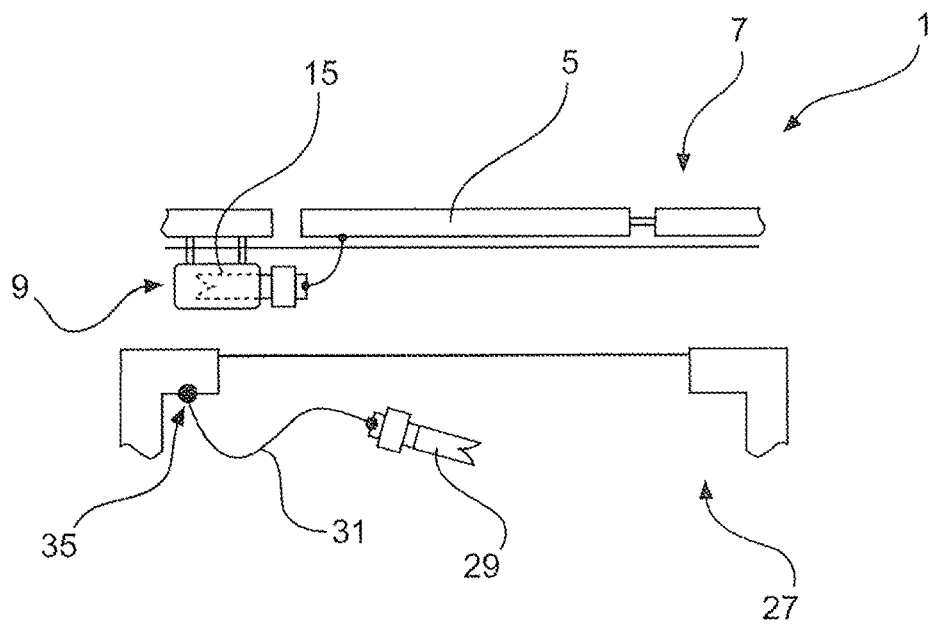
FIG. 4 shows a side view of the arrangement of FIG. 3 from above in a first operating condition.
Figure 5:
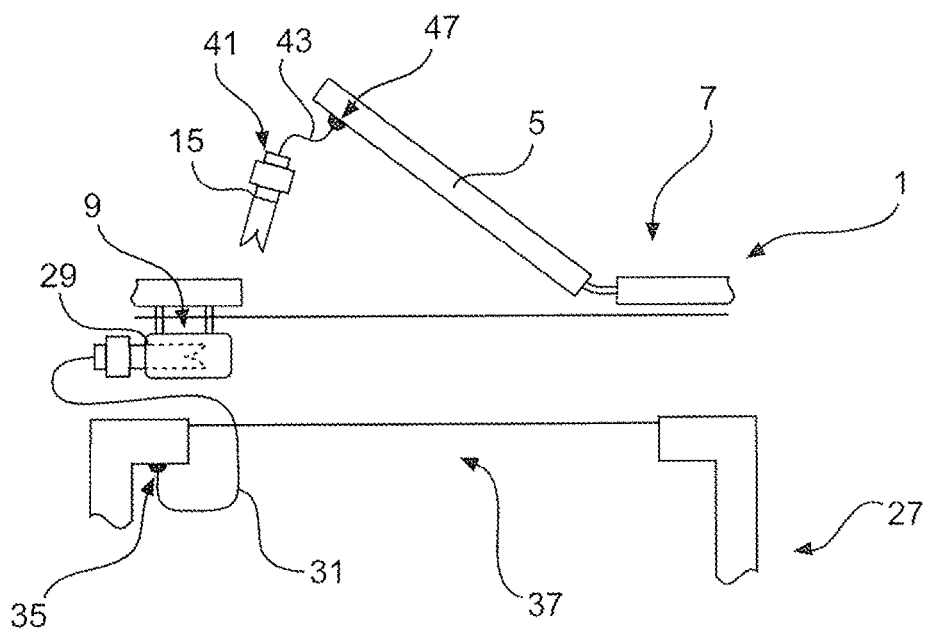
FIG. 5 shows the FIG. 4 arrangement in an alternative operating condition.

Two detail views of the alternative locking positions of the locking mechanism of the locking device 9 according to the invention are shown in FIGS. 4 and 5. The condition shown in FIG. 4 illustrates the second locking element 15 in the locking position within the locking device 9, whereby the closure element 5 is locked in the closed position relative to the railing 7. One is prevented from passing on to or leaving the working gallery 1 in the position shown in FIG. 4. The first locking element 29 is in a release position, but is fixed by the first connecting member 31 to the second portion 35, within the lift 27.

In FIG. 5 in contrast the first locking element 29 is disposed in a locking position with the locking mechanism arranged within the locking device 9. The first connecting member 31 which in the present case is in the form of a chain is deflected substantially to its maximum and extends through the access portion 37 out of the interior of the lift 27. The first connecting member 31 is still fixed to the second portion 35 within the lift 27. In contrast to the first locking element 29 the second locking element 15 is in a release position. The second locking element 15 is fixed on a first portion 41 of a second connecting member 43. The second connecting member 43 which in the present case is in the form of a chain is in turn fixed in a second portion 47 of the connecting member to the closure element 5 which is in the form of a door. The closure element 5 is pivoted out of a closed position into an opened position and is angled relative to the railing 7. In the FIG. 5 position, it is possible to leave and enter the lift 27 or the working platform 1, while up and down movement of the lift 27 is prevented.

Figure 6:
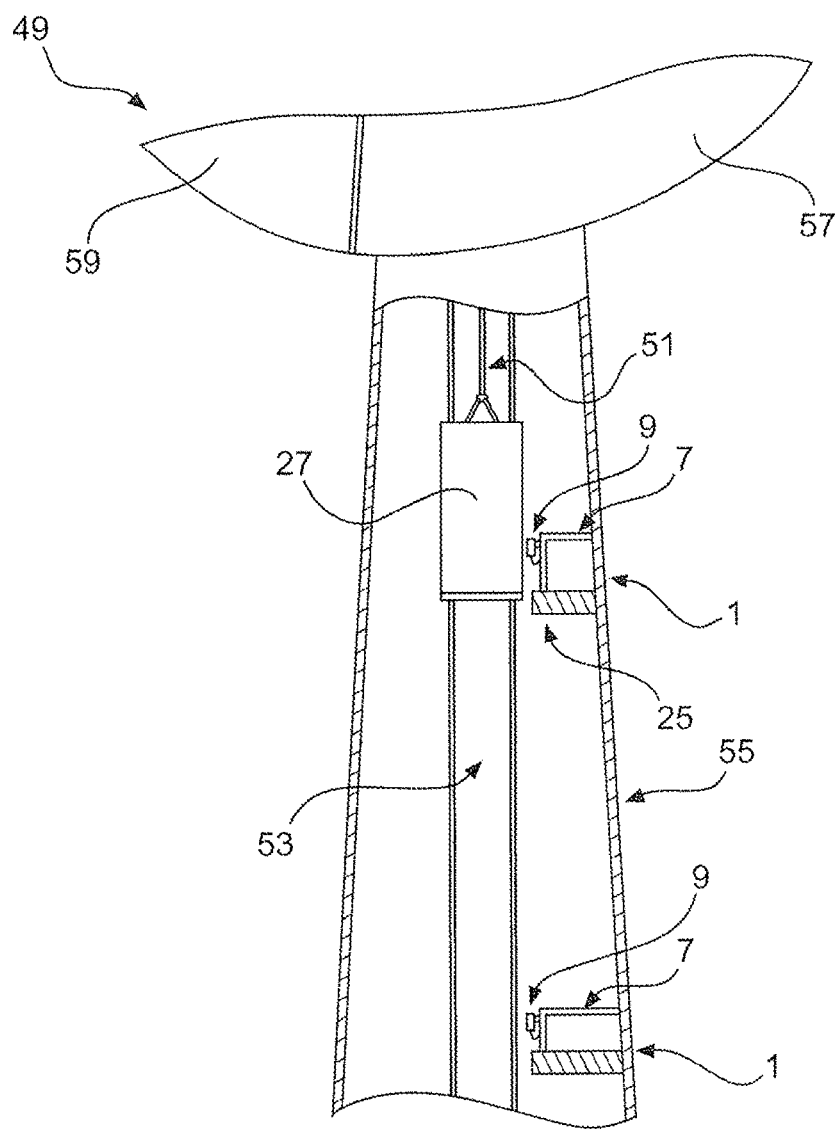
FIG. 6 shows a diagrammatic view of a wind power installation according to an embodiment of the invention.

FIG. 6 diagrammatically shows a broken-away portion of a wind power installation 49 according to the invention. In its interior the wind power installation 49 has a lift 27 according to the invention, which is suspended from a pulling arrangement 51 and is guided by a guide arrangement 53. In addition to the lift 27, arranged within a pylon 55 of the wind power installation 49 are a plurality of working galleries or platform structures, of which two are shown. The working galleries 1 each have a railing 7 to which a locking device 9 is stationarily mounted. FIG. 6 shows that the lift 27 is disposed in the proximity of one of the working galleries 1 in such a way that it is possible to pass through between the lift 27 and the working platform 1 in the transfer region 25.

FIG. 6 does not show that the lift can be displaced upwardly into the nacelle equipped with the rotor 59. It is however noted that this represents a further alternative possibility in accordance with the present invention. The nacelle can also provide a locking device according to the invention on a railing or a similar structure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claim is:

1. A wind power installation working gallery comprising:
   a lift;
   a working platform;
   a transfer region between the lift and the working platform;
   a railing arranged on the working platform, wherein the railing includes a closure element that is configured to close an opening in the railing, the closure element being arranged at the transfer region;
   a first locking element connected to the lift;
   a second locking element connected to the closure element; and
   a locking device located at the transfer region between the lift and the working platform, the locking device having a unitary body with a first end for receiving the first locking element and a second end for receiving the second locking element, the locking device including a locking mechanism adapted to release one of the first and second locking elements in response to locking the other of the first and second locking elements relative to the locking device.

2. The wind power installation working gallery according to claim 1 wherein the first locking element is at least one of a coin, a profiled and/or contoured flat body, a bar, or a hollow body.

3. The wind power installation working gallery according to claim 1 wherein the second locking element is at least one of a coin, a profiled and/or contoured flat body, a bar, or a hollow body.

4. The wind power installation working gallery according to claim 1 wherein the locking mechanism is a deposit lock system.

5. The wind power installation working gallery according to claim 1 wherein the locking device is secured to the railing.

6. The wind power installation working gallery according to claim 5 wherein the closure element has a first end that is pivotably connected to the railing.

7. The wind power installation working gallery according to claim 1 wherein the closure element is a bar, a chain, or a door.

8. A wind power installation comprising:
    a ground plane;
    at least one working gallery;
    a lift for travelling between the ground plane and the at least one working gallery;
    a transfer region between the lift and the at least one working gallery;
    a railing arranged on the at least one working gallery, wherein the railing includes a closure element that is configured to close an opening in the railing, the closure element being arranged at the transfer region;
    a first locking element connected to the lift;
    a second locking element connected to the closure element; and
    a locking device located in the transfer region and having a unitary body with a first end for receiving the first locking element and a second end for receiving the second locking element, the locking device including a locking mechanism being adapted to release one of the first and second locking elements in response to locking the other of the first and second locking elements relative to the locking device.

9. The wind power installation according to claim 8 wherein the locking device is secured to the railing.

10. The wind power installation according to claim 8 wherein:
    a first end of the closure element is pivotably connected to the railing.

* * * * *